United States Patent
Uchida et al.

(10) Patent No.: US 8,356,203 B2
(45) Date of Patent: Jan. 15, 2013

(54) ASYNCHRONOUS INTERFACE CIRCUIT AND DATA TRANSFER METHOD

(75) Inventors: Atsushi Uchida, Kawasaki (JP); Yuji Hanaoka, Kawasaki (JP); Terumasa Haneda, Kawasaki (JP); Yoko Kawano, Kawasaki (JP); Emi Narita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 12/787,020

(22) Filed: May 25, 2010

(65) Prior Publication Data

US 2010/0306570 A1    Dec. 2, 2010

(30) Foreign Application Priority Data

May 29, 2009    (JP) .................................. 2009-129798

(51) Int. Cl.
*G06F 1/12*    (2006.01)
(52) U.S. Cl. .................. 713/600; 713/400; 365/189.02; 365/189.05; 369/47.28
(58) Field of Classification Search .................. 713/400, 713/600; 365/189.02, 189.05; 369/47.28
See application file for complete search history.

(56) References Cited

U.S. PATENT DOCUMENTS

| | | | |
|---|---|---|---|
| 6,724,683 B2 * | 4/2004 | Liao | 365/189.02 |
| 7,493,508 B2 * | 2/2009 | Shimoyama | 713/400 |
| 7,937,607 B2 * | 5/2011 | Hayano et al. | 713/600 |
| 8,095,717 B1 * | 1/2012 | White | 710/306 |

FOREIGN PATENT DOCUMENTS

| | | |
|---|---|---|
| JP | 07-030528 | 1/1995 |
| JP | 07-115410 | 5/1995 |

* cited by examiner

*Primary Examiner* — Thuan Du
(74) *Attorney, Agent, or Firm* — Staas & Halsey LLP (57) ABSTRACT

An asynchronous interface circuit for transferring a data stream between different clock domains, the asynchronous interface circuits includes a data holding circuit for sequentially receiving and transferring data of the data stream in synchronism with a first clock signal, and holding the received data until an input of a next data, an asynchronous memory for sequentially receiving the data held in the data holding circuit in synchronism with the first clock signal and for outputting the data in the order of inputting in synchronism with a second clock signal. The asynchronous interface circuit further includes a monitor for detecting an operating state of the asynchronous memory, and a selector for selecting one of the data output from the asynchronous memory and the data output from the data holding circuit on the basis of a detecting result of the monitor.

20 Claims, 6 Drawing Sheets

ASYNCHRONOUS INTERFACE CIRCUIT AND DATA TRANSFER METHOD

CROSS-REFERENCE TO RELATED APPLICATION

This application is based upon and claims the benefit of priority of the prior Japanese Patent Application No. 2009-129798, filed on May 29, 2009, the entire contents of which are incorporated herein by reference.

FIELD

The embodiments discussed herein are related to an asynchronous interface circuit and a data transfer method.

BACKGROUND

In an asynchronous interface circuit for transferring data between asynchronous circuits, clock transfer is performed. This transfer is performed by receiving data from a source circuit in synchronism with a clock signal in the source circuit and by outputting the data to a destination circuit in synchronism with a clock signal in the destination circuit.

A clock transfer circuit therefore may apply a data transfer method to an asynchronous buffer without synchronization between a source (or transmitter) and a destination (or receiver). For example, the asynchronous buffer may be a clock transfer circuit including a first-in-first-out buffer (hereinafter called FIFO) between a data transmission path of a transmitter and a data transmission path of a receiver. The data written within the FIFO in synchronism with the write clocks transmitted from a transmitter may be read in the order of writing in synchronism with read clocks in a receiver.

Asynchronous interface circuits may have predetermined interface specifications because the manufacturers of the source and destination of data may often differ. For example, ONFI (Open NAND Flash Interface) specifications that are interface specifications for NAND-type flash memories define a flash memory interface based on a DDR (Double Data Rate) interface. According to the ONFI specifications, in response to a data read request from a controller, a flash memory generates an output clock signal including the equal number of clocks to the number of clocks for outputting the requested data and outputs the data in synchronism with the output clock signals. The details of the interface specifications are defined by ONFI that is one of the industry standard groups, and the specifications are published (URL;http://onfi.org/). Then, there is Japanese Laid-open Patent Publication No. 7-115410 as a reference document.

However, even on the basis of the specifications, normal data transfer may sometimes be difficult in such asynchronous interface circuits in the past.

For example, the ONFI specifications are based on a DDR interface, but a target flash memory may not typically be equivalent to a general DDR-RAM (Random Access Memory) for internal operations. For that reason, even when a control device (hereinafter called controller) that controls reading and writing data from and to a flash memory is designed on the basis of the ONFI specifications, the controller may not be allowed to connect to all flash memories designed on the basis of the ONFI specifications. The examples will be described below.

Figure 6:
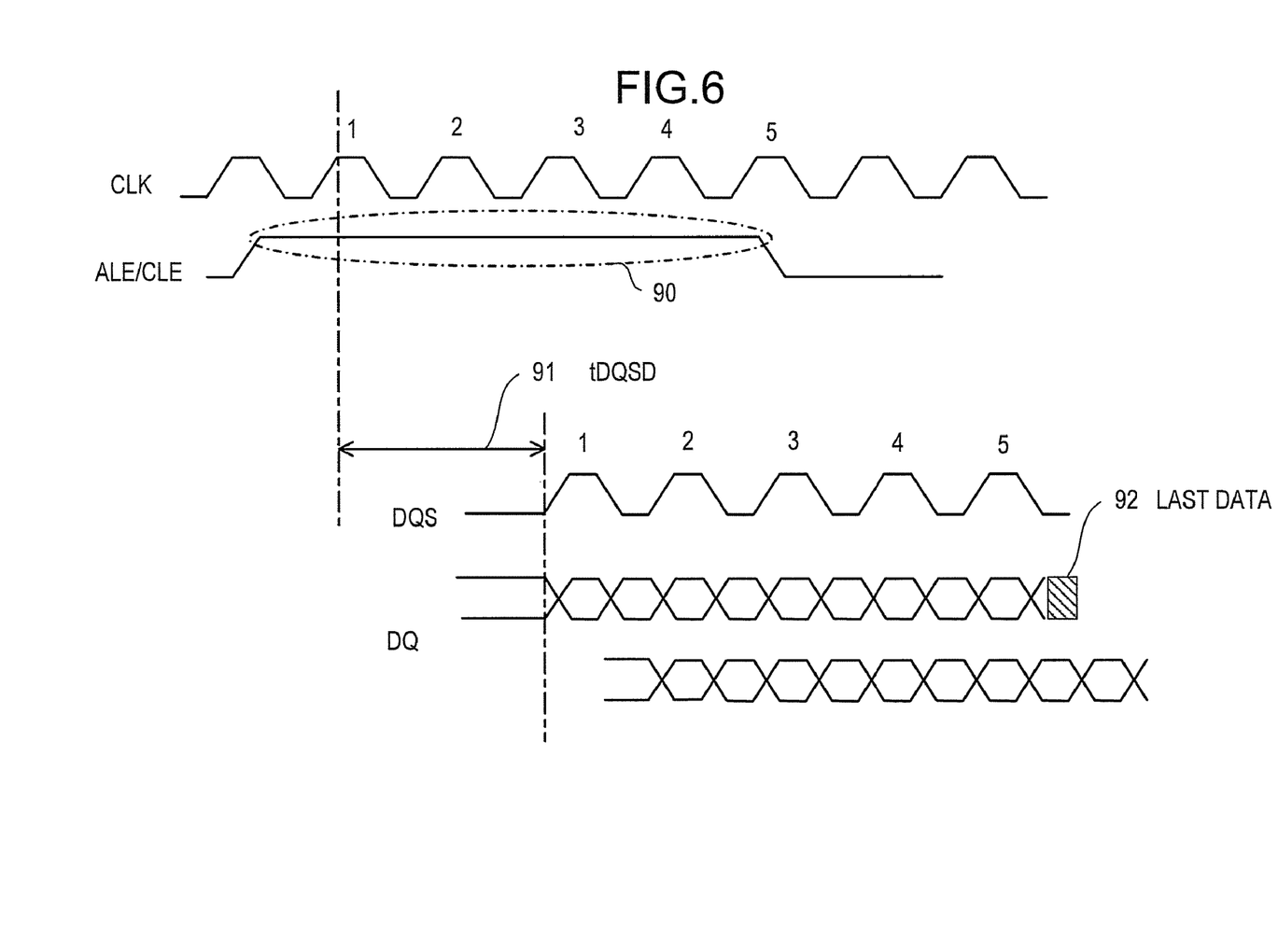
FIG. 6 illustrates an example of a timing chart for reading DDR-data on the basis of the ONFI specifications.

FIG. 6 illustrates a timing example for reading DDR-data on the basis of the ONFI specifications. Reading DDR-data is data transfer from a flash memory to the controller.

The illustrated CLK is a clock signal to be generated by the controller in a destination, and the clock cycle is 12 nanoseconds (hereinafter called nsec), for example. The ALE (address latch enable)/CLE (command latch enable) is a signal to be generated by the controller and is asserted during the period for the number of clock cycles according to the number of data to be read from the flash memory. In the example in FIG. 6, since data for five words are to be read, the ALE/CLE has High level during a period of five clock cycles of the clock CLK. The period will be called assert cycle hereinafter.

The flash memory counts the clocks CLK during the assert cycle of the ALE/CLE, and determines the number of DQS clocks to be issued. The DQS is an output clock signal for transferring output data (which is read data from the controller). In the illustrated example, the number of clocks CLK detected during an assert cycle 90 of the ALE/CLE is "5", and the number of DQS clocks to be issued is thus "5". However, a delay tDQSD 91 occurs during the period from the detection by the flash memory of the clock signal CLK from the controller to the actual issuance of the DQS. The ONFI specifications define that the maximum value of the delay tDQSD 91 is 20 nsec. Since flash memories have individual differences, the delay tDQSD 91 is allowed a margin of 0 to 20 nsec. The value is higher than the clock cycle (12 nsec) on the controller, and it is difficult to define the timing for capturing data on the controller. This causes a problem that the controller may not capture the data in a timed manner.

The data transfer using a FIFO includes data transmission in at least two stages of capturing data (DQ) and writing the data to the FIFO. The number of DQS clocks to be issued corresponds to the size of the data requested by the controller. Thus, when the controller transmits read data in the two or more stages in synchronism with the DQS, it is difficult to transfer the last data 92. In other words, the last data 92 are captured in synchronism with the last DQS clock (in the first stage). However, since no DQS occurs, the processing in the second stage in which the last data are to be written to the FIFO is not performed.

SUMMARY

According to an aspect of the embodiment, an asynchronous interface circuit for transferring a data stream between different clock domains, the asynchronous interface circuits includes a data holding circuit for sequentially receiving and transferring data of the data stream in synchronism with a first clock signal, and holding the received data until an input of a next data, an asynchronous memory, connected to the data holding circuit, for sequentially receiving the data held in the data holding circuit in synchronism with the first clock signal and for outputting the data in the order of inputting in synchronism with a second clock signal, a monitor for detecting an operating state of the asynchronous memory, and a selector, connected to the asynchronous memory and the data holding circuit, for selecting one of the data output from the asynchronous memory and the data output from the data holding circuit on the basis of a detecting result of the monitor.

According to an another aspect of the embodiment, a data transfer method for transferring a data stream between different clock domains in an asynchronous interface circuit, the data transfer method includes sequentially receiving and transferring data of the data stream in synchronism with a first clock signal, and holding the received data by a data holding circuit until an input of a next data, sequentially receiving the data held in the data holding circuit in synchronism with the first clock signal and outputting the data in the order of inputting in synchronism with a second clock signal by an asynchronous memory, detecting an operating state of the asynchronous memory, and selecting one of the data output from the asynchronous memory and the data output from the data holding circuit on the basis of a result of the detecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present techniques will be explained with reference to accompanying drawings.

Figure 1:
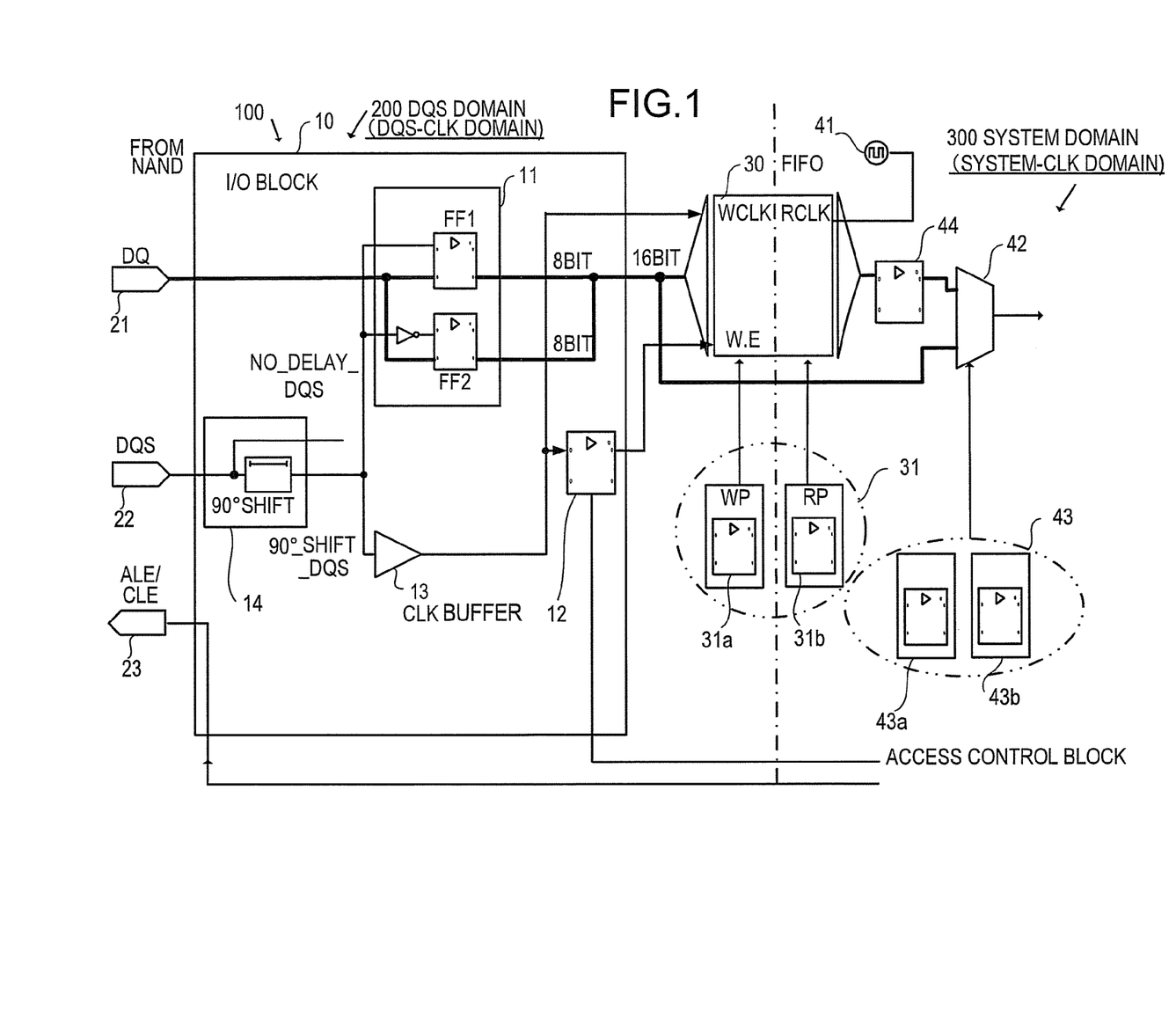
FIG. 1 is a block diagram illustrating a configuration example of an asynchronous interface circuit of a first embodiment.

FIG. 1 is a block diagram illustrating a configuration example of an asynchronous interface circuit of a first embodiment.

The asynchronous interface circuit may be implemented in, for example, a memory controller that reads and writes data from and to a NAND-type flash memory (hereinafter called NAND). FIG. 1 illustrates a read circuit that transfers data stored in the NAND to the controller.

The asynchronous interface circuit 100 is internally divided into a unit that operates in synchronism with clocks in a system domain (System-CLK Domain) 300 and a unit that operates in synchronism with clocks in a DQS domain (DQS-CLK Domain) 200. Hereinafter, those units will be called a system-domain unit and a DQS-domain unit, respectively. The illustrated alternate long and short dashed lines indicate the boundary between the system-domain unit 300 and the DQS-domain unit 200. An asynchronous buffer (which is a FIFO here and will be called FIFO hereinafter) 30 is arranged on the boundary between the DQS-domain unit and the system-domain unit and operates in synchronism with both DQS clocks and system clocks.

Now, there will be described a DQ 21 and a DQS 22 to be input from the NAND and an ALE/CLE (signal) 23 to be output to the NAND.

The DQ 21 is a data signal, and data in units of one word for 8-bit width are input from the NAND. For example, high order bits (bits 8 to 15) and low order bits (bits 0 to 7) may be alternately input. The DQS 22 is a data strobe signal to be issued by the NAND for transferring the DQ 21 and is a clock signal for operating an I/O block 10. The clock signal to be issued includes clocks the number of which corresponds to the number of system clocks counted during an assert cycle of the ALE/CLE 23, which will be described later. The ALE/CLE 23 is an enable signal causing the access control block that performs access control to have High level during an assert cycle according to the number of requested data and is set by the system.

The NAND starts issuing the DQS 22 according to the number of system clocks detected during an assert cycle of the ALE/CLE 23 after a tDQSD delay from the detection of the start of the assert cycle. In synchronism with the DQS 22, the DQ 21 here is output.

The DQS-domain unit includes a data holding circuit 11, a write enable (which will be called WE hereinafter) setting circuit 12, a CLK buffer 13 and a shift circuit 14 and operates as an I/O block 10 that performs signal transmission processing to the NAND. Within the DQS-domain unit, the DQ 21 corresponding to the read data requested to read by the system-domain unit is transferred in two stages through the data holding circuit 11 and the FIFO 30.

The data holding circuit 11 includes an input terminal connected to the DQ 21 and an output terminal connected to the FIFO 30. The output terminal of the data holding circuit 11 is connected to a multiplexer 42 that constitutes a unit performing in a system-CLK domain. The data holding circuit 11 receives the DQ 21 from the NAND and holds the input data until the input of the next data. The data holding circuit 11 includes a first flip-flop circuit (FF 1) that holds the DQ 21 input in synchronism with a leading edge of a clock signal and a second flip-flop circuit (FF 2) that holds the DQ 21 input in synchronism with a falling edge of the clock signal. The clock signal may be a DQS shift signal generated by the shift circuit 14. The DQS shift signal will be described later.

The WE setting circuit 12 includes an input terminal connected to the CLK buffer 13 and an output terminal connected to the FIFO 30 and may include an FF, for example. If a DQS shift signal input through the CLK buffer 13 is detected, the state of the write enable signal WE for the FIFO 30 is changed to a state "Write-Enabled". The state "Write-Enabled" set once is reset in accordance with an instruction from the access control block.

The shift circuit 14 receives the DQS 22, generates a DQS shift signal as a result of the shift by 90 degrees of the phase of the DQS 22 and outputs the DQS shift signal to the data holding circuit 11 and CLK buffer 13.

The FIFO 30 includes an input terminal connected to the data holding circuit 11 in the DQS-domain unit and an output terminal connected to the multiplexer 42 through an FF 44 in the system-domain unit and performs data transfer from the DQS-domain unit to the system-domain unit. The data transfer processing is controlled by a transferring processing portion 31 including a write processing portion 31a and a read processing portion 31b. The write processing portion 31a in synchronism with the DQS shift signal functioning as write clocks WCLK writes the transfer data held in the data holding circuit 11 to the FIFO 30. The region to write the data is instructed by a write pointer WP. The read processing portion 31b in synchronism with the system clocks as read clocks RCLK reads the data written to the FIFO 30 and outputs the read data to the inside of the system-domain unit. The read processing portion 31b operates in synchronism with the system clocks. Thus, the write pointer WP may be synchronized with the system clocks and be compared with the read pointer RP which is synchronous with the system clocks. Thus, the data setting in the FIFO 30 may be recognized. If data is set, the data is read from the FIFO 30. In other words, if data is transferred through the FIFO 30, the instruction of the write pointer WP precedes the instruction of the read pointer RP. Thus, when the pointers do not agree, it may be determined that the data is being transferred to the FIFO 30. When the data transfer stops, the pointers agree.

The circuits included in the I/O block 10 operate only when the DQS 22 is input.

The system-domain unit operates in synchronism with system clocks 41 of the memory controller. The system-domain unit includes the multiplexer 42, a monitoring portion 43 that monitors the state of the FIFO 30 and the FF 44.

The multiplexer 42 is connected to the FIFO 30 through the FF 44 and is connected to the data holding circuit 11 in the DQS-domain unit. The multiplexer 42 functions as a selecting circuit that selects and outputs an input signal (read data) from the FIFO 30 or data holding circuit 11 to the memory controller. If, on the basis of the operating state of the FIFO 30 instructed by the monitoring portion 43, it is determined that the transfer data is being written to the FIFO 30 in the DQS-domain unit, the multiplexer 42 selects and outputs the transfer data input from the FIFO 30. If it is determined that the writing of transfer data to the FIFO 30 in the DQS-domain unit ends, the multiplexer 42 selects and outputs the data held in the data holding circuit 11.

The monitoring portion 43 includes a counter 43a used for checking the operating state of the FIFO 30 and a state machine 43b that expresses the operating state as its state. The counter 43a counts the elapsed time from the stop of the data transfer through the FIFO 30. At a normal state, that is, when data is being transferred through the FIFO 30, the write pointer WP precedes the read pointer RP. Therefore, when they do not agree, it may be determined that the data is being written to the FIFO 30. When the data transfer stops, the pointers agree. Accordingly, the write pointer WP and the read pointer RP may be compared, and the count value may be increased when they agree while the count value may be reduced when they do not agree. Thus, while the data transfer is being performed, the count value is not increased. When the data transfer stops, the count value starts increasing. The state machine 43b monitors the count value of the counter 43a. If the count value is equal to or higher than a predetermined value, it is determined that the data transfer has stopped. Then, the machine state is set. It is assumed that the state may be "IDLE" indicating the initial state where no data transfer is being performed, "STATE-1" where data transfer is being performed or "STATE-2" where the stop of data transfer is detected, in the following descriptions.

Figure 2:
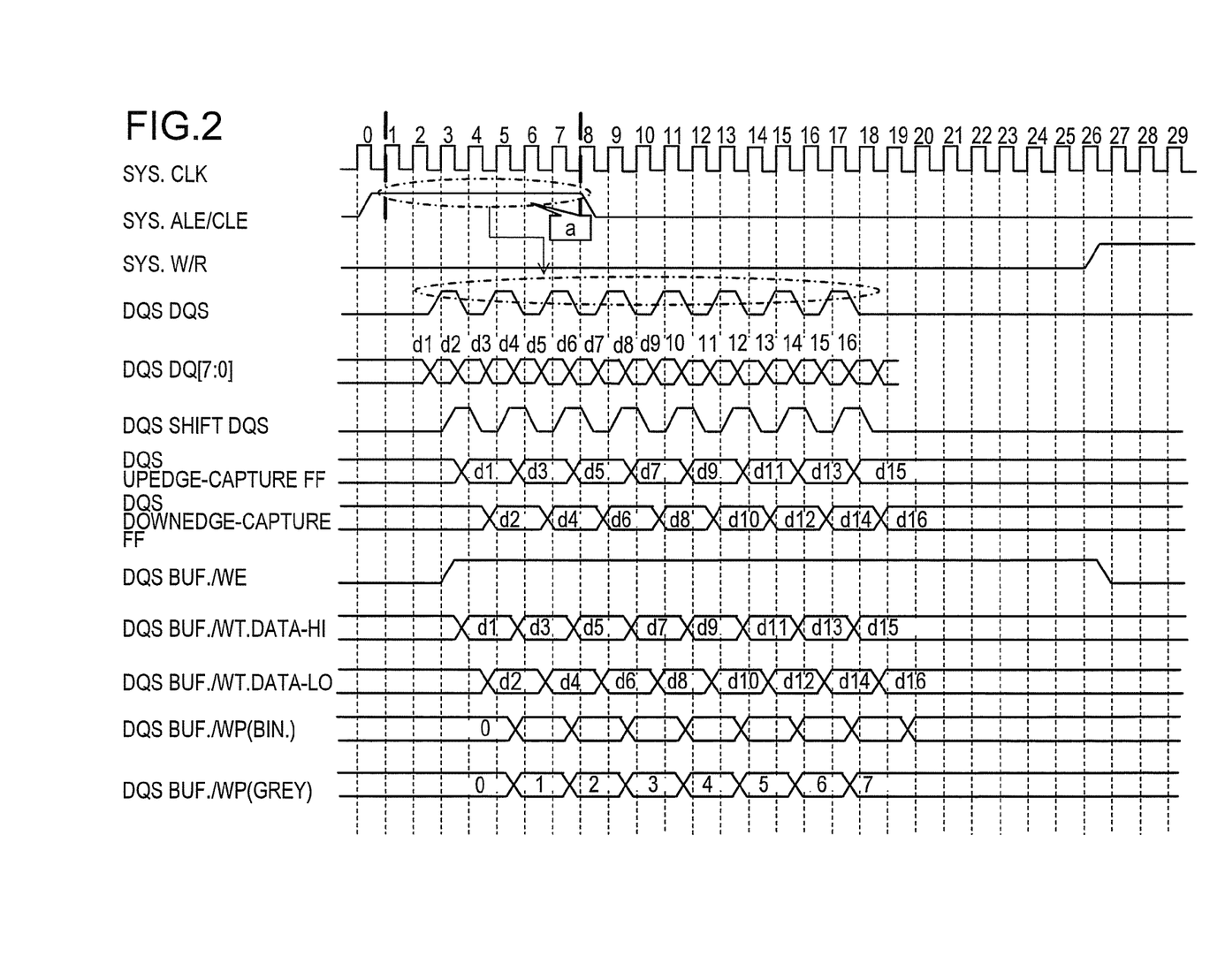
FIG. 2 illustrates an example of a timing chart of data transfer operations by the asynchronous interface circuit in FIG. 1.

There will be described operations by the asynchronous interface circuit with reference to FIGS. 2 and 3. FIG. 2 illustrates a timing example of data transfer operations for buffer writing by the asynchronous interface circuit in FIG. 1.

The term "SYS" in FIG. 2 refers to system clocks or an input/output signal to/from the part that operates in synchronism with the system clocks. The term "DQS" refers to a DQS or an input/output signal to/from the part operating in synchronism with the DQS.

The term "SYS. CLK" in FIG. 2 refers to a system clock signal. The "SYS. ALE/CLE" keeps High level during an assert cycle determined in accordance with the number of data requested to read by the system-domain unit. In the example in FIG. 2, the ALE/CLE keeps High level during the assert cycle for eight data from the SYS. CLK (0) to the SYS. CLK (7). The "SYS. W/R" that determines the direction of data transfer indicates that data transfer is performed from the NAND to the controller. The "SYS. CLK", "SYS. ALE/CLE" and "SYS. W/R" are signals generated in the system-domain unit and are transmitted to the NAND.

In response to the signals, the NAND outputs to the I/O block 10 the DQS 22 and DQ 21 corresponding to the number of clock cycles during an assert cycle of the ALE/CLE. In the example in FIG. 2, the DQ 21 corresponding to the number of clock cycles, "8", during an assert cycle and the DQS 22 is output [a]. The DQ 21 is divided into data in units of one word including 8 bits and is output in synchronism with the DQS 22. The data in 8-bit units will be called d1, d2, . . . and d16 hereinafter (among which d's after d10 are omitted in FIG. 2). In FIG. 2, the DQS 22 is represented by "DQS DQS", and the DQ 21 is represented by "DQS DQ [7:0]".

Next, there will be described operations by the I/O block 10 within the DQS-domain unit. In response to the input of the DQS 22, the circuits in the I/O block 10 start operating.

In the I/O block 10, the shift circuit 14 generates a DQS shift signal ("DQS SHIFT DQS" in FIG. 2) from the input DQS. When the input of the DQS shift signal starts, the WE setting circuit 12 sets the write enable signal WE ("DQS BUF./WE" in FIG. 2) for the FIFO 30. The data holding circuit 11 sets the values of the DQ 21 to the FF 1 at the leading edge of the DQS shift signal and to the FF 2 at the falling edge. The setting of the DQ 21 to the FF 1 is represented by "DQS UPEDGE-CAPTURE FF" in FIG. 2. Similarly, the setting of the DQ 21 to the FF 2 is represented by "DQS DOWNEDGE-CAPTURE FF" in FIG. 2. The data held in the FF 1 and FF 2 are transferred to the FIFO 30 in synchronism with the DQS shift signal as the clocks. For example, at the first leading edge of the DQS shift signal, the write enable signal WE for the FIFO 30 is set, and the DQ 21 is set to the FF 1.

The data "DQS UPEDGE-CAPTURE FF" set to the FF 1 is enabled to transfer to the FIFO 30 ("DQS BUF/WT.DATA-HI" in FIG. 2). Similarly, the data "DQS DOWNEDGE-CAPTURE FF" set to the FF 2 is enabled to transfer to the FIFO 30 ("DQS BUF/WT.DATA-LO" in FIG. 2). In synchronism with the DQS shift signal as the clocks and in timing of the next DQS clock (which is the same as "DQS BUF./WP (BIN.)"), the data is written in units of one word to the FIFO 30. The value of the write pointer at that time changes like the "DQS BUF./WP(GREY)" in FIG. 2. The "DQS BUF./WP (GREY)" is updated while the write enable signal WE for the FIFO 30 is set.

Through these operations, in the I/O block 10 in the DQS-domain unit, the DQ 21 is set to the FIFO 30 in synchronism with the clock signal based on the DQS 22. As illustrated in FIG. 2, the last data d15 and d16 are set to the FF 1 and FF 2, respectively, in the data holding circuit 11. However, since the DQS shift signal is lost, the data transfer to the FIFO 30 is not performed.

Next, there will be described reading processing in the system-domain unit.

Figure 3:
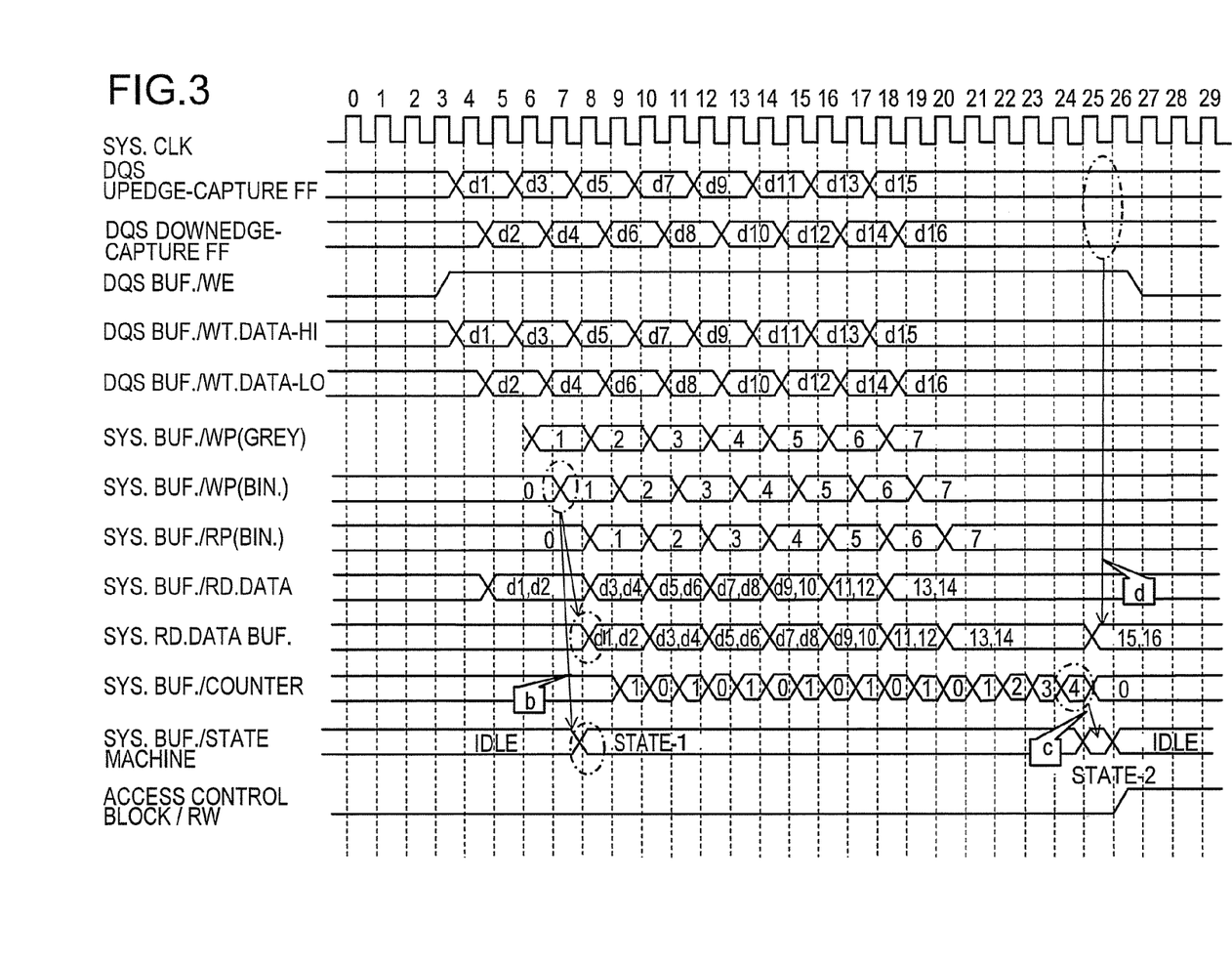
FIG. 3 illustrates another example of the timing chart of data transfer operations in the asynchronous interface circuit in FIG. 1.

FIG. 3 illustrates a timing example of data transfer operations for buffer reading in the asynchronous interface circuit in FIG. 1. Since the terms "SYS. CLK" through the "SYS. BUF./WP (GREY)" are the same as those in FIG. 2, the description will be omitted.

In the read processing portion 31b, the write pointer ("SYS. BUF./WP(BIN.)" in FIG. 3) synchronized with the system clocks and read pointer ("SYS. BUF./RP(BIN.)" in FIG. 3) are compared. If they do not agree, data is read from the FIFO 30, and the read pointer RP is advanced. The term "SYS. BUF./RD.DATA" represents data written in the FIFO 30, that is, data readable by the read processing portion 31b. As illustrated in FIG. 3, the last data d15 and d16 have not been written in the FIFO 30. The read processing portion 31b reads data every time the write pointer WP advances in synchronism with the system clocks. As represented by the "SYS. RD.DATA BUF." in FIG. 3, the readable data (d1, . . . and d14) written in the FIFO 30 are sequentially read in word units.

When the write pointer ("SYS. BUF./RP(BIN.)" in FIG. 3) changes from "0" to "1", the state machine 43b changes the state from the "IDLE" to the "STATE-1" in synchronization with the next system clock [b]. At the same time, the data reading from the FIFO 30 is started. At the "STATE-1", the multiplexer 42 selects and outputs the read data from the FIFO 30, which are input through the FF 44. Thus, the "SYS. RD.DATA BUF." in FIG. 3 corresponds to the output signal from the multiplexer 42. In response to the change in state to the "STATE-1", the counter 43a also starts operating. The counter 43a compares the read pointer and the write pointer in synchronism with the system clocks. In FIG. 3, the operation by the counter 43a is represented by the "SYS. BUF./COUNTER". The count values of the counter 43a have the repetition of "1" and "0" while the data transfer through the FIFO 30 is being performed. When the state where the read pointer and the write pointer agree continues, the value of the counter keeps increasing. When the value of the counter reaches a predetermined value ("4" in the example in FIG. 3), the state machine 43b changes the state to the "STATE-2" [c]. The state "STATE-2" is a state to be changed to the initial state in one cycle of the system clocks "SYS. CLK".

The state changed to the "STATE-2" causes the multiplexer 42 to read the data (d15 and d16) held in the data holding circuit 11 in the I/O block 10 in synchronism with the system clocks [d]. Thus, the last data (d15 and d16) are captured into the system-domain unit. If the access control block detects that all data had been read, the access control block ends the reading processing and outputs an instruction to reset the write enable signal WE to the FF 12. Then, the write enable signal WE for the FIFO 30 is reset. The state is changed to the initial state "IDLE".

In this way, in an ONFI-based system that performs data transfer in two stages, the last data not written in the asynchronous buffer may be captured by using the path directly connected to the data holding circuit that holds the last data. Thus, the last data may be transferred, and secure data transfer is allowed between asynchronous circuits.

In the configuration above, the write pointer and the read pointer are compared to detect the end point of the data transfer, and the last data are directly acquired from the data holding circuit. Generally, data transfer may often be performed on a plurality of words collectively, and secure data transfer may be performed in that case.

However, when read data is one word that is a minimum unit, one DQS is only generated. The DQ 21 is transferred to the FF 1 and FF 2 in the data holding circuit 11 but is not written to the FIFO 30. Therefore, the disagreement between the write pointer and the read pointer does not occur, and the comparison may not function as the indicator for detection of the stop of the data transfer. Since the access control block of course knows whether the read request data is one word or not, the time when the data is captured to the data holding circuit 11 may be judged, and the data may be input to the inside of the system on the basis of the judgment.

According to a second embodiment, the data transfer on one word is detected, and the data is transferred to the inside of the system more securely.

Figure 4:
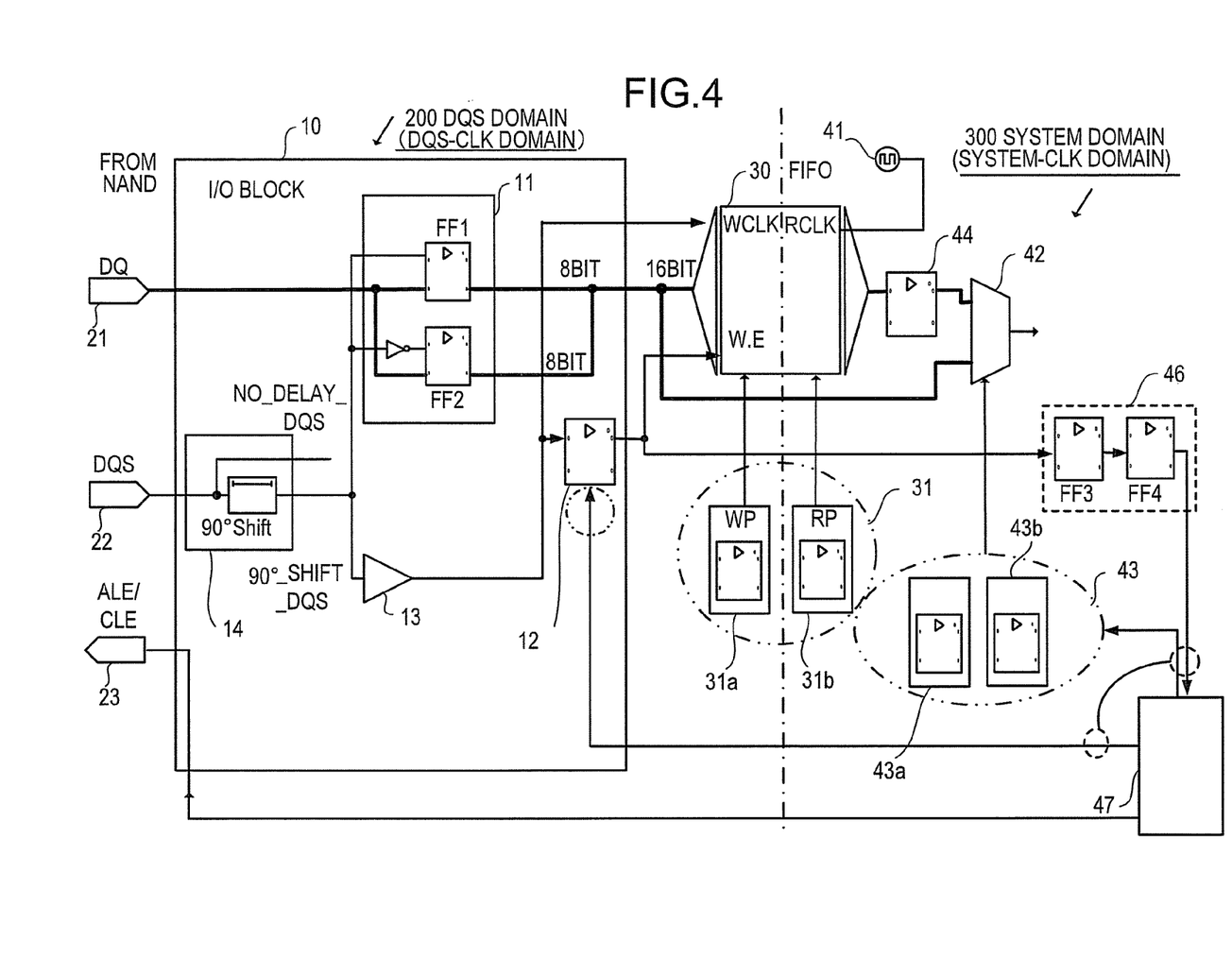
FIG. 4 is a block diagram illustrating a configuration example of an asynchronous interface circuit according to a second embodiment.

FIG. 4 is a block diagram illustrating a configuration example of an asynchronous interface circuit according to the second embodiment. The same reference numerals are given to the same components as those in FIG. 1, and the description will be omitted.

The asynchronous interface circuit of the second embodiment includes a synchronous circuit 46 in addition to the asynchronous interface circuit illustrated in FIG. 1.

The synchronous circuit 46 includes an FF 3 and an FF 4 and receives the input of an output signal from the FF 12 for generating a write enable signal WE for the FIFO 30 and detects the change in write enable signal WE. The synchronous circuit 46 then notifies the state machine 43b of the detected write enable signal WE as a synchronization signal for performing data capturing to the system-domain unit. In the example in FIG. 4, the synchronous circuit 46 performs the notification through the access control block 47 to the state machine 43b. Either configuration is applicable.

On the basis of the notified synchronization signal, the state machine 43b changes the state to the "STATE-2". The multiplexer 42 in response to the "STATE-2" selects and outputs the data held in the FF 1 and FF 2 in the data holding circuit 11.

Figure 5:
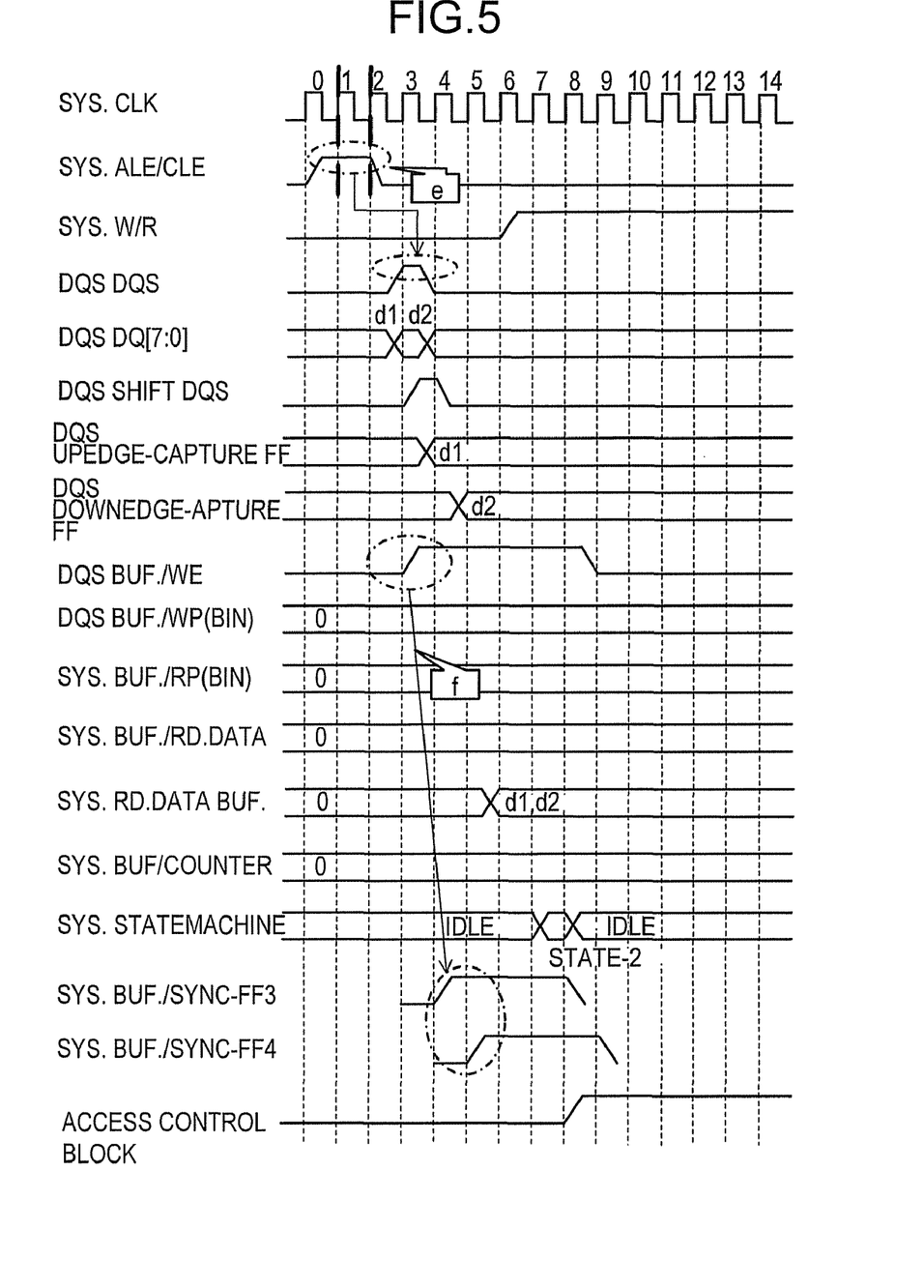
FIG. 5 illustrates an example of a timing chart of a data transferring operation in the asynchronous interface circuit in FIG. 4.

There will be described operations for reading one word in the asynchronous interface circuit of the second embodiment. FIG. 5 illustrates a timing example of a data transferring operation in the asynchronous interface circuit in FIG. 4. The illustrated signals have the same signal names as those illustrated in FIGS. 2 and 3.

The access control block 47 outputs an ALE/CLE signal that requests read data for one word. The system clock "SYS. CLK" detected during an assert cycle represented by the "SYS. ALE/CLE" in FIG. 5 is "1". The NAND outputs the DQ 21 and DQS 22 for the clock cycle [e]. In synchronism with the DQS 22 represented by the "DQS DQS" in FIG. 5, the DQ 21 that includes read data is output in 8-bit units. In FIG. 5, the d1 and d2 of the "DQS DQ [7:0]" represents the DQ 21.

The d1 and d2 of the DQ 21 are captured to the FF 1 and FF 2 ("DQS UPEDGE-CAPTURE FF" and "DQS DOWNEDGE-CAPTURE FF" in FIG. 5), respectively, in the data holding circuit 11 in synchronism with a DQS shift signal. The DQS shift signal is used as a clock signal for writing data held in the FF 1 and FF 2 to the FIFO 30. However, since the DQS here is one clock, it is difficult to transfer the data held in the FF 1 and FF 2 to the FIFO 30.

When the input of the DQS shift signal starts, the WE setting circuit 12 sets the write enable signal WE ("DQS BUF./WE" in FIG. 5) for the FIFO 30.

Since no data is written to the FIFO 30, both of the write pointer WP and read pointer RP do not change. However, the FF 3 ("SYS. BUF./SYNC-FF3" in FIG. 5) included in the synchronous circuit is changed to High level in synchronism with the next system clock to the detection of the change of the FF 12 ("DQS BUF./WE" in FIG. 5) to High level. In the next system clock cycle, the FF 4 ("SYS. BUF./SYNC-FF4" in FIG. 5) is changed to High level in response to the input data to the FF 3 [f].

If the state machine 43b detects that the FF 4 has been changed to High level directly or through the access control block 47, the state machine 43b changes the state to the "STATE-2". Thus, the multiplexer 42 selects the data holding circuit 11 in the I/O block 10 and outputs the read data d1 and d2 held in the FF 1 and FF 2 ("SYS. RD.DATA BUF" in FIG. 5). After that, the state is returned to the initial state "IDLE", and the processing ends.

The "STATE-2" includes the change to the initial state "IDLE" after one Sys. CLK cycle, which is the same as the cases in FIGS. 2 and 3. In this way, when the size of transfer data is one word that is a minimum unit, data writing is detected on the basis of the write enable signal WE, and the requested data may be read.

Having described the ONFI-based asynchronous interface circuits according to the embodiments, the present techniques are not limited thereto. In the disclosed asynchronous interface circuit, the clocks for the transfer data are only issued, and secure data transfer may be performed on the asynchronous interface circuit that transmits data in two or more stages on the basis of the clocks.

Thus, data of a data stream are transferred through an asynchronous buffer as a data transfer path, and the last data of the data stream are transferred through a different path.

This allows the use of a different path for transferring the last data that are not transferred due to the clock loss in the source and allows secure data transfer between asynchronous circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An asynchronous interface circuit for transferring a data stream between different clock domains, the asynchronous interface circuits comprising:
    a data holding circuit for sequentially receiving and transferring data of the data stream in synchronism with a first clock signal, and holding the received data until an input of a next data;
    an asynchronous memory, connected to the data holding circuit, for sequentially receiving the data held in the data holding circuit in synchronism with the first clock signal and for outputting the data in the order of inputting in synchronism with a second clock signal;
    a monitor for detecting an operating state of the asynchronous memory; and
    a selector, connected to the asynchronous memory and the data holding circuit, for selecting one of the data output from the asynchronous memory and the data output from the data holding circuit on the basis of a detecting result of the monitor.

2. The asynchronous interface circuit according to claim 1, wherein the first clock signal is a clock signal generated according to the number of clocks for transferring the data stream.

3. The asynchronous interface circuit according to claim 2, wherein the data holding circuit includes a plurality of flip-flop circuits that hold separately the data of the data stream input in synchronism with the first clock signal.

4. The asynchronous interface circuit according to claim 3, wherein the selector selects the data output from the asynchronous memory when the detected operating state of the asynchronous memory is that the transfer processing is being performed, and the data output from the data holding circuit when a stop of the transfer processing is detected.

5. The asynchronous interface circuit according to claim 3, wherein the monitor includes a synchronous circuit for detecting a write-enable signal for the data to the asynchronous memory and outputting the write enable signal as a synchronization signal when the write-enable signal has an enable state for a predetermined period of time, and the selector selects the data output from the data holding circuit when a stop of the processing of transferring the data to the asynchronous memory is detected and when a presence of written data is detected.

6. The asynchronous interface circuit according to claim 4, wherein the monitor includes a transferring processor for comparing a write pointer to instruct a region to write the data in the asynchronous memory and a read pointer that instructs a region to read the data from the asynchronous memory, and
    a counter for measuring the time when the write pointer and the read pointer agree, and the monitor determines that a processing of transferring the data through the asynchronous memory has stopped when the measured value of the counter is equal to or higher than a predetermined value.

7. The asynchronous interface circuit according to claim 1, wherein the data holding circuit includes a plurality of flip-flop circuits that hold separately the data of the data stream input in synchronism with the first clock signal.

8. The asynchronous interface circuit according to claim 1, wherein the selector selects the data output from the asynchronous memory when the detected operating state of the asynchronous memory is that the transfer processing is being performed, and the data output from the data holding circuit when a stop of the transfer processing is detected.

9. The asynchronous interface circuit according to claim 8, wherein the monitor includes a transferring processor for comparing a write pointer to instruct a region to write the data in the asynchronous memory and a read pointer that instructs a region to read the data from the asynchronous memory, and
    a counter for measuring the time when the write pointer and the read pointer agree, and the monitor determines that a processing of transferring the data through the asynchronous memory has stopped when the measured value of the counter is equal to or higher than a predetermined value.

10. The asynchronous interface circuit according to claim 1, wherein the monitor includes a synchronous circuit for detecting a write-enable signal for the data to the asynchronous memory and outputting the write enable signal as a synchronization signal when the write-enable signal has an enable state for a predetermined period of time, and the selector selects the data output from the data holding circuit when a stop of the processing of transferring the data to the asynchronous memory is detected and when a presence of written data is detected.

11. A data transfer method for transferring a data stream between different clock domains in an asynchronous interface circuit, the data transfer method comprising:
    sequentially receiving and transferring data of the data stream in synchronism with a first clock signal, and holding the received data by a data holding circuit until an input of a next data;
    sequentially receiving the data held in the data holding circuit in synchronism with the first clock signal and outputting the data in the order of inputting in synchronism with a second clock signal by an asynchronous memory;
    detecting an operating state of the asynchronous memory; and
    selecting one of the data output from the asynchronous memory and the data output from the data holding circuit on the basis of a result of the detecting.

12. The data transfer method according to claim 11, wherein the first clock signal is a clock signal generated according to the number of clocks for transferring the data stream.

13. The data transfer method according to claim 12, wherein the data holding circuit includes a plurality of flip-flop circuits that hold separately the data of the data stream input in synchronism with the first clock signal.

14. The data transfer method according to claim 13, wherein the selecting includes selecting the data output from the asynchronous memory when the detected operating state of the asynchronous memory is that the transfer processing is being performed, and selecting the data output from the data holding circuit when a stop of the transfer processing is detected.

15. The data transfer method according to claim 13, wherein the detecting includes detecting a write-enable signal for the data to the asynchronous memory in synchronism with the first clock signal and outputting the write enable signal as a synchronization signal when the write-enable signal has an enable state for a predetermined period of time, and the selecting includes selecting the data output from the data holding circuit when the stop of the processing of transferring the data to the asynchronous memory is detected and when the presence of written data is detected.

16. The data transfer method according to claim 14, wherein the detecting includes comparing a write pointer to instruct a region to write the data in the asynchronous memory and a read pointer that instructs a region to read the data from the asynchronous memory, measuring the time when the write pointer and the read pointer agree, and determining that a processing of transferring the data through the asynchronous memory has stopped when the measured value is equal to or higher than a predetermined value.

17. The data transfer method according to claim 11, wherein the data holding circuit includes a plurality of flip-flop circuits that hold separately the data of the data stream input in synchronism with the first clock signal.

18. The transfer method according to claim 11, wherein the selecting includes selecting the data output from the asynchronous memory when the detected operating state of the asynchronous memory is that the transfer processing is being performed, and selecting the data output from the data holding circuit when a stop of the transfer processing is detected.

19. The data transfer method according to claim 18, wherein the detecting includes comparing a write pointer to instruct a region to write the data in the asynchronous memory and a read pointer that instructs a region to read the data from the asynchronous memory, measuring the time when the write pointer and the read pointer agree, and determining that a processing of transferring the data through the asynchronous memory has stopped when the measured value is equal to or higher than a predetermined value.

20. The data transfer method according to claim 11, wherein the detecting includes detecting a write-enable signal for the data to the asynchronous memory in synchronism with the first clock signal and outputting the write enable signal as a synchronization signal when the write-enable signal has an enable state for a predetermined period of time, and the selecting includes selecting the data output from the data holding circuit when the stop of the processing of transferring the data to the asynchronous memory is detected and when the presence of written data is detected.

* * * * *